US 11,444,533 B2

(12) United States Patent
Wu et al.

(10) Patent No.: US 11,444,533 B2
(45) Date of Patent: Sep. 13, 2022

(54) SYSTEM AND METHOD FOR POWER STAGE CURRENT-SENSE ACCURACY IMPROVEMENT IN A POWER SYSTEM

(71) Applicant: DELL PRODUCTS, LP, Round Rock, TX (US)

(72) Inventors: Feng-Yu Wu, Taipei (TW); Guangyong Zhu, Austin, TX (US); Shiguo Luo, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 156 days.

(21) Appl. No.: 16/989,232

(22) Filed: Aug. 10, 2020

(65) Prior Publication Data
US 2022/0045605 A1 Feb. 10, 2022

(51) Int. Cl.
*H02M 3/158* (2006.01)
*H02M 1/00* (2006.01)

(52) U.S. Cl.
CPC .......... *H02M 3/158* (2013.01); *H02M 1/0009* (2021.05)

(58) Field of Classification Search
CPC ............................ H02M 3/158; H02M 1/0009
USPC ....................................................... 323/282
See application file for complete search history.

(56) References Cited

U.S. PATENT DOCUMENTS

| 9,639,102 | B2 | 5/2017 | Dally | |
| 2012/0229107 | A1* | 9/2012 | Chen | H02M 3/1588 323/271 |
| 2016/0094122 | A1* | 3/2016 | Luo | G06F 1/32 323/285 |
| 2021/0159788 | A1* | 5/2021 | Kasturi | G01R 19/0092 |
| 2021/0408911 | A1* | 12/2021 | Upadhyaya | H02M 1/325 |

FOREIGN PATENT DOCUMENTS

EP 2438671 B1 4/2012

OTHER PUBLICATIONS

See attached search report from EIC 2800 searcher Salim Alam for claim 1 on Feb. 6, 2022. (Year: 2022).*
See attached search report from EIC 2800 searcher Salim Alam for claim 8 on Feb. 7, 2022. (Year: 2022).*
See attached search report from EIC 2800 searcher Salim Alam for claim 11 on Feb. 8, 2022. (Year: 2022).*
See attached search report from EIC 2800 searcher Vaisali Koppolu for claim 20 on Feb. 9, 2022. (Year: 2022).*

* cited by examiner

*Primary Examiner* — Shawki S Ismail
*Assistant Examiner* — Htet Z Kyaw
(74) *Attorney, Agent, or Firm* — Larson Newman, LLP (57) ABSTRACT

A power stage includes a power converter having high- and low-side switches, a driver circuit that drives the switching power converter based upon a PWM signal, and a current sensing circuit that detects a low-side current level on the low-side switch, and provides a current level signal that includes the low-side current level. The power stage turns on the low-side switch at a first time, and estimates a first low-side current level at the first time. In estimating the first low-side current level, the power stage detects a second low-side current level at a second time while the low-side switch is turned on, the second time being after the first time, and detects a third low-side current level at a third time while the low-side switch is turned on, wherein the third time is after the second time. The first low-side current level is estimated based upon the second and third low-side current levels.

20 Claims, 8 Drawing Sheets

SYSTEM AND METHOD FOR POWER STAGE CURRENT-SENSE ACCURACY IMPROVEMENT IN A POWER SYSTEM

FIELD OF THE DISCLOSURE

This disclosure generally relates to information handling systems, and more particularly relates to power stage current-sense accuracy improvement in a power system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A power stage of a power system may include a power converter having high- and low-side switches, a driver circuit that drives the switching power converter based upon a PWM signal, and a current sensing circuit that detects a low-side current level on the low-side switch, and provides a current level signal that includes the low-side current level. The power stage may turn on the low-side switch at a first time, and estimate a first low-side current level at the first time. In estimating the first low-side current level, the power system may detect a second low-side current level at a second time while the low-side switch is turned on, the second time being after the first time, and detect a third low-side current level at a third time while the low-side switch is turned on, wherein the third time is after the second time. The first low-side current level may be estimated based upon the second and third low-side current levels

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
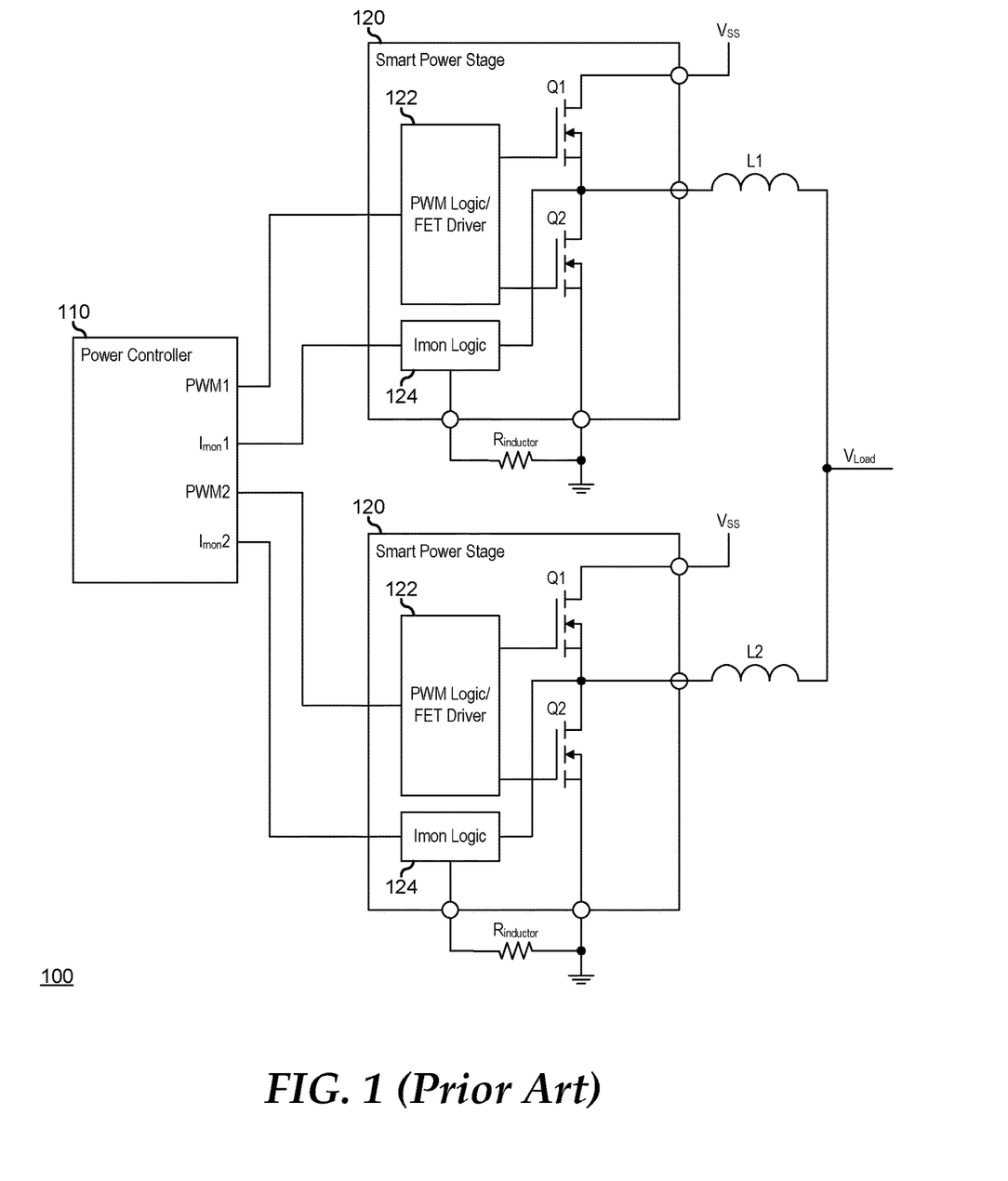
FIG. 1 is a block diagram of a power system of an information handling system of the prior art.

FIG. 1 illustrates a power system 100 in accordance with the prior art. Power system 100 includes a power controller 110, and one or more power stage, here illustrated as two power stages 120. Power system 100 represents a power supply system for an information handling system that is configured to receive power at a supply voltage ($V_{SS}$), and to regulate power to a load at a load voltage ($V_{Load}$). An example of power system 100 may include a main power supply for an information handling system, such as a power supply module for a modular server system that provides multiple outputs to power various loads of the server system, a voltage regulator system for one or more particular components of an information handling system, such as a voltage regulator module to provide power to one or more processors of the information handling system, or another power supply and regulation system within an information handling system, as needed or desired.

Power controller 110 represents an integrated circuit device, a logic circuit, a processing device, or the like, configured to control power stage 120. In particular, power controller 110 is configured to determine various power states within the information handling system, such as an on state, an off state, a standby state, and the like, to determine load conditions on the load, to determine various environmental conditions within power stage 120, and within the information handling system, and to provide control signaling to the power stages to regulate power at the supply voltage level ($V_{SS}$) to the load at the load voltage level ($V_{Load}$). More particularly, power controller 110 operates to receive current monitor signals (Imon) from power stage 120, and to provide pulse-width modulation (PWM) signals to the power stages. Other details of controlling power stages based upon power states within an information handling system, based upon various environmental conditions within a power stage or an information handling system, and the like, are known in the art and will not be further described herein except as needed to illustrate the disclosed embodiments.

Power stage 120 represents a switching power supply. Typically the load voltage level ($V_{Load}$) is a lower voltage level than the supply voltage level ($V_{SS}$) and power stage 120 represent buck converters. Power stage 120 includes a PWM logic and field-effect transistor (FET) driver 122 (hereinafter "driver 122"), and Imon logic 124. Driver 122 represents logic or a circuit configured to receive a PWM signal from power controller 110, and to translate the PWM signal into a driver output to the gate of a high-side FET (Q1) and a driver output to the gate of a low-side FET (Q2) to maintain the load voltage ($V_{Load}$) at an output of power stage 120. In a particular embodiment, the PWM signal is pulse width modulated and driver 122 utilizes a high state of the PWM signal to drive the gate of the high-side FET (Q1), and utilizes a low state of the PWM signal to drive the gate of the low-side FET (Q2). In another embodiment, the PWM signal is a digital signal that encodes a duty cycle and driver 122 decodes the digital signal and generates the gate driver signals based upon the encoded duty cycle. The details of PWM signaling in voltage regulation are known in the art, and will not be further described herein except as needed to illustrate the disclosed embodiments.

Imon logic 122 operates to provide an indication to power controller 110 of the power provided to the load by power stage 120. In particular, Imon logic 122 detects various voltages and the currents flowing through the high- and low-side FETS (Q1 and Q2), and to provide an Imon signal to power controller 110. The Imon signal is based upon an estimate of the total current provided to the load by power stage 120. It has been understood by the inventors of the current invention that, as the current demands of loads such as processors increase, the need for accuracy in the Imon signal is likewise increasing. In particular where a load is consuming current at or above a current limit of the power stage, the accuracy of the Imon signal may be decreased due to noise generated by the hard switching of the high- and low-side FETs. Moreover, using prior art current detection methods may lead to undue throttling of the power stage, excessive ripple in the output voltage, unexpected fault conditions, and the like.

Figure 2:
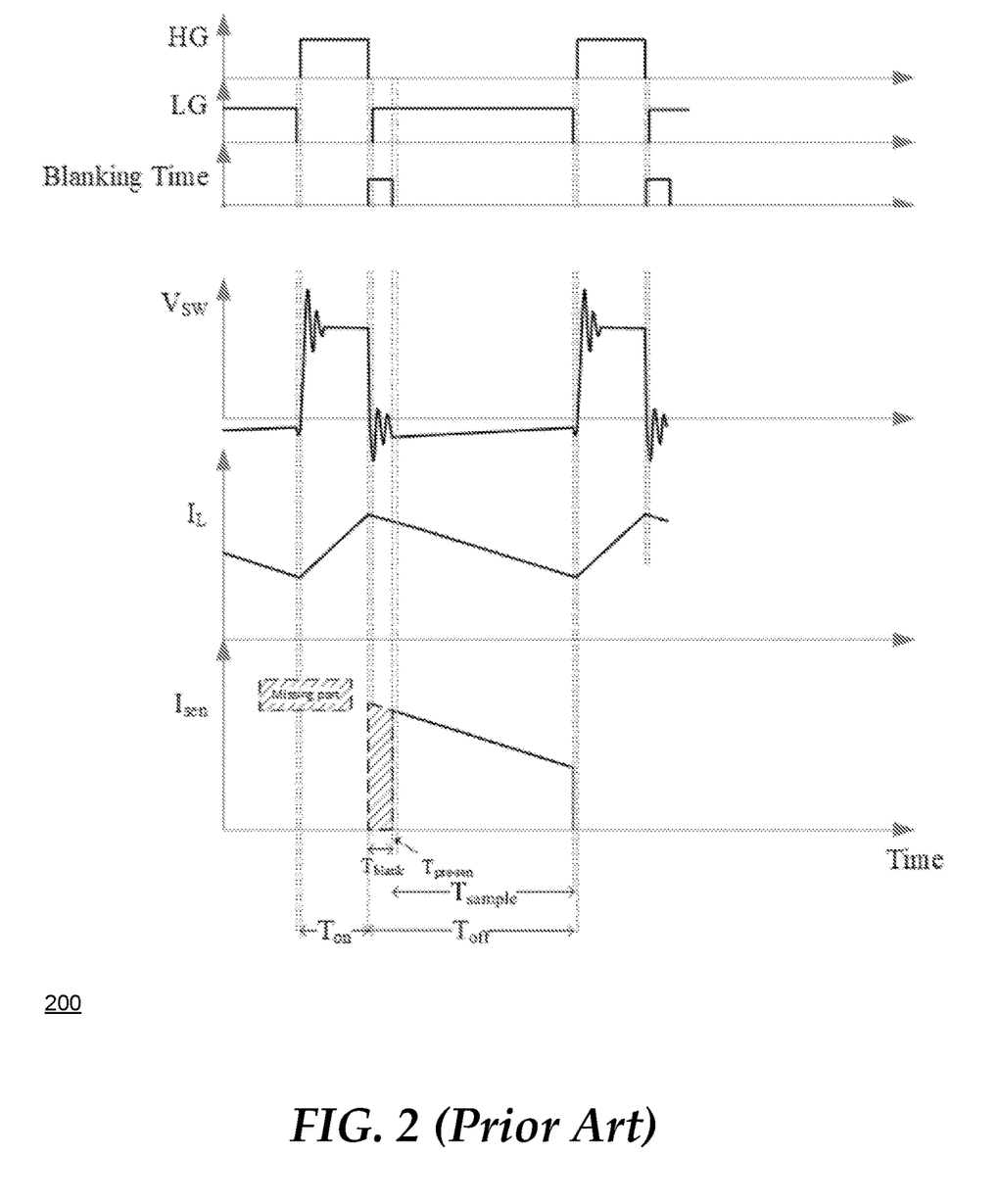
FIG. 2 illustrates waveforms associated with the power system of FIG. 1.

FIG. 2 illustrates the waveforms associated with the Imon signal estimation in power stage 120, including a high-side gate driver signal (HG) for the high-side FET (Q1), and a low-side gate driver signal (LG) for the low-side FET (Q2). Also illustrated is a switching voltage ($V_{SW}$). Note here that the switching voltage shows ripples at the high-side FET off-to-on transition and the high-side FET on-to-off transition. Here, when the low-side FET is on and the high-side FET is off, the inductor current ($I_L$) decreases, and when the high-side FET is on and the low-side FET is off, the inductor current ($I_L$) increases. Ideally, the inductor current ($I_L$) is the same as the current indicated by the Imon signal from Imon logic 124. Imon logic 124 typically senses the inductor current ($I_L$) by measuring the voltage drop across the low-side FET (Q2). However, because of the noise associated with the on-to-off transition of the high-side FET (Q1)/off-to-on transition of the low-side FET (Q2), the voltage measurement across the low-side FET (Q2) immediately after the low-side gate driver signal (LG) goes high is too noisy to accurately measure the voltage across the low-side FET until the noise ripple has subsided. For this reason, Imon logic 124 implements a blanking time ($T_{Blank}$) after the low-side gate driver signal (LG) is asserted, within which the measured voltage across the low-side FET is disregarded in estimating the total current. Thus, the Imon signal provided by Imon logic 124 for the low-side FET on time ($I_{Sen}$) is shown as including an inaccuracy as compared to the inductor current ($I_L$).

When the power provided by power stage 120 is low, the ratio of the duration of the blanking time ($T_{Blank}$) to the duration of the on time of the low-side FET ($T_{L-ON}$) is small, and thus the inaccuracy in the Imon signal is minimal. However, as the power provided by power stage 120 increases, Imon logic 124 increases the duration of the blanking time ($T_{Blank}$), and the ratio of the duration of the blanking time ($T_{Blank}$) to the duration of the on time of the low-side FET ($T_{L-ON}$) increases, and the accuracy of the Imon signal decreases.

In a particular case, Imon logic 124 operates to compensate for the inaccuracy in the Imon signal. Here, a pre-set parameter is used to estimate a current slew rate and amplitude of the voltage signal during the blanking time. In particular, Imon logic 124 receives an indication of the load inductance via an external resistor ($R_{Inductor}$). For example, the value of the external resistor ($R_{Inducltor}$) may be selected to represent a specific inductance value for current emulation by Imon logic 124. Here, a ripple current may be estimated as:

$$\Delta I_L = (V_{IN} - V_{OUT}) V_{OUT} / (F_{SW} \times L \times V_{IN})$$  Equation 1 where $\Delta I_L$ is the current ripple, $V_{IN}$ is the input voltage ($V_{SS}$), $V_{OUT}$ is the output voltage ($V_{Load}$), $F_{SW}$ is the PWM switching frequency, and L is the inductance as indicated by the external resistor ($R_{Inductor}$).

Figure 3:
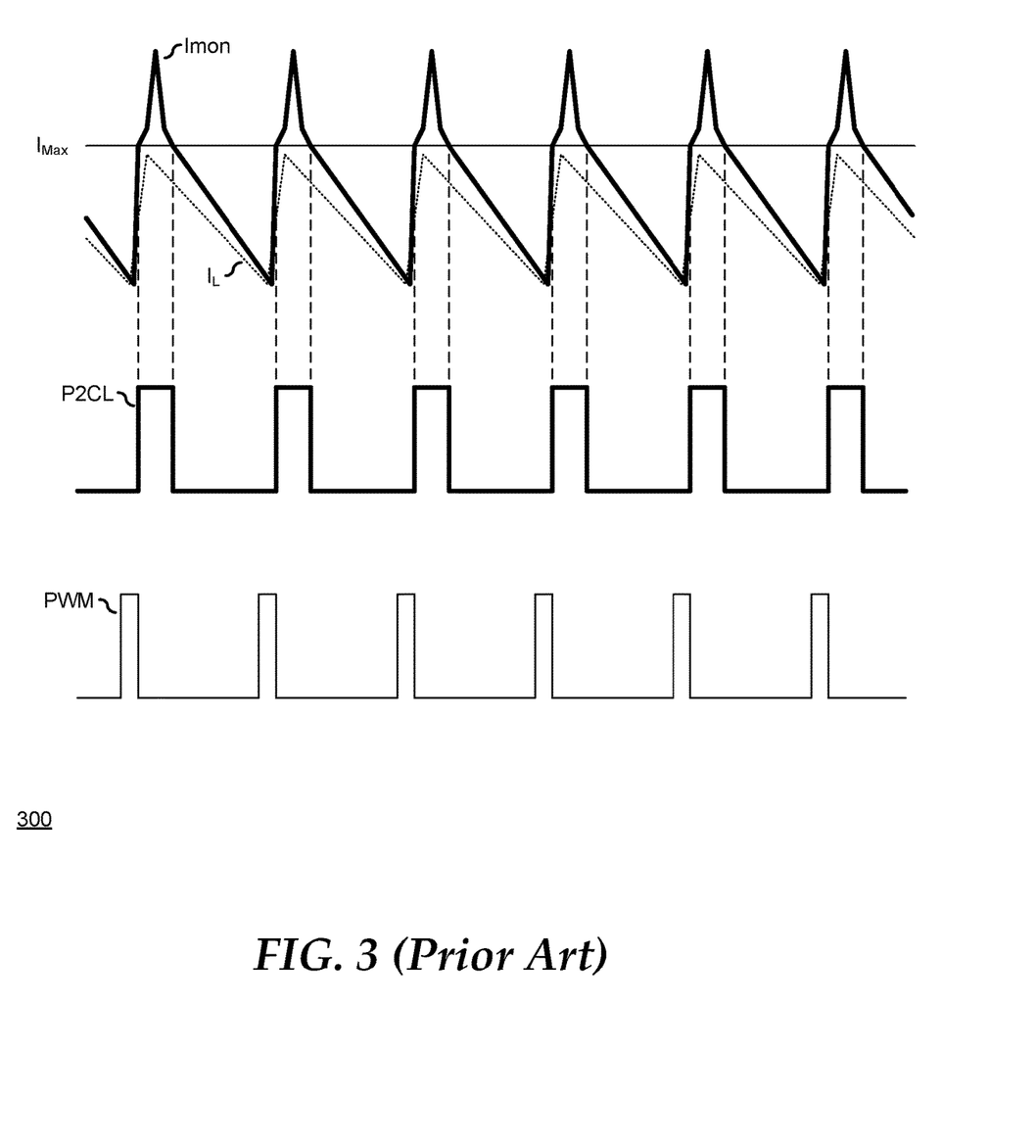
FIG. 3 illustrates exemplary current detection waveforms associated with the power system of FIG. 1.

However, accuracy of the Imon signal may still be compromised because of the accuracy of the components of power system 100. For example, the actual inductance may have a large tolerance (+/−20%), and the external resistor ($R_{Inductor}$) may have a large tolerance (+/−5%). For example, FIG. 3 shows example waveforms for power system 100. Here, a PWM signal is shown at the bottom. A measured inductor current ($I_L$) is shown at the top (shown as a dotted line), with the associated Imon signal output (shown as a solid line) for a high load condition. Note that, while the measured inductor current ($I_L$) remains below a high current limit ($I_{Max}$) for power stage 120, the Imon signal indicates a peak current above the high current limit ($I_{Max}$). Here, in response to the erroneous current level indicated by the Imon signal, power controller 110 operates to implement a pulse-to-pulse current limitation (P2CL) signal to protect power stage 120 from an overcurrent condition.

Figure 4:
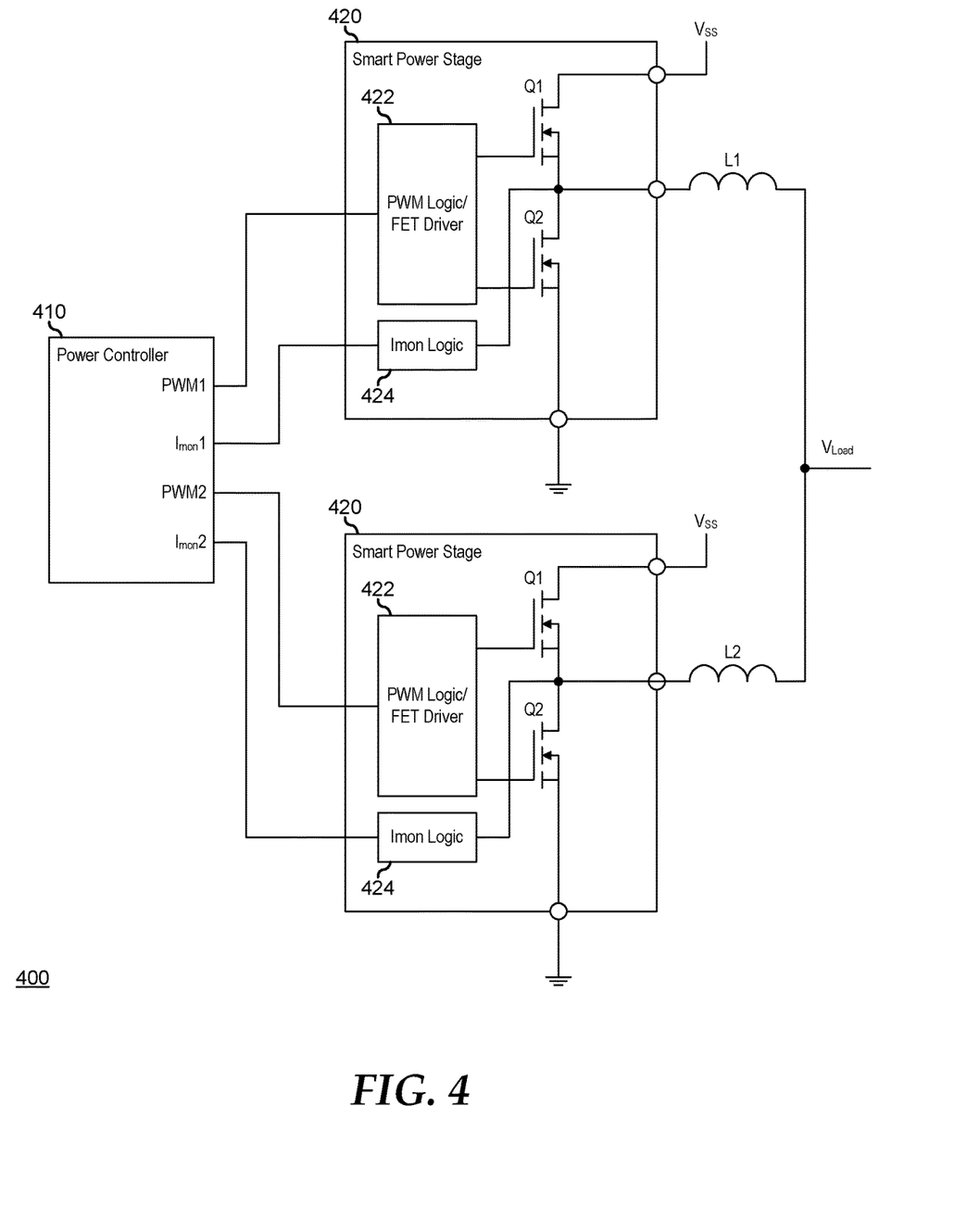
FIG. 4 is a block diagram of a power system of an information handling system in accordance with an embodiment of the present disclosure.

FIG. 4 illustrates an embodiment of a power system 400 similar to power system 100 and including a power controller 410, and one or more power stage, here illustrated as two power stages 420. Power system 400 represents a power supply system for an information handling system that is configured to receive power at a supply voltage ($V_{SS}$), and to regulate power to a load at a load voltage ($V_{Load}$). Power controller 410 is similar to power controller 110 and represents an integrated circuit device, a logic circuit, a processing device, or the like, configured to control power stage 420. As such, power controller 410 operates to receive current monitor signals (Imon) from power stage 420, and to provide pulse-width modulation (PWM) signals to the power stages.

Power stage 420 is similar to power stage 120, and includes a PWM logic and field-effect transistor (FET) driver 422 (hereinafter "driver 422"), and Imon logic 424. Driver 422 represents logic or a circuit configured to receive a PWM signal from power controller 410, and to translate the PWM signal into a driver output to the gate of a high-side FET (Q1) and a driver output to the gate of a low-side FET (Q2) to maintain the load voltage ($V_{Load}$) at an output of power stage 420. In a particular embodiment, the PWM signal is pulse width modulated and driver 422 utilizes a high state of the PWM signal to drive the gate of the high-side FET (Q1), and utilizes a low state of the PWM signal to drive the gate of the low-side FET (Q2). In another embodiment, the PWM signal is a digital signal that encodes a duty cycle and driver 422 decodes the digital signal and generates the gate driver signals based upon the encoded duty cycle. Imon logic 422 operates to provide an indication to power controller 410 of the power provided to the load by power stage 420. In particular, Imon logic 422 detects various voltages and the currents flowing through the high- and low-side FETS (Q1 and Q2), and to provide an Imon signal to power controller 410. The Imon signal is based upon an estimate of the total current provided to the load by power stage 420.

Figure 5:
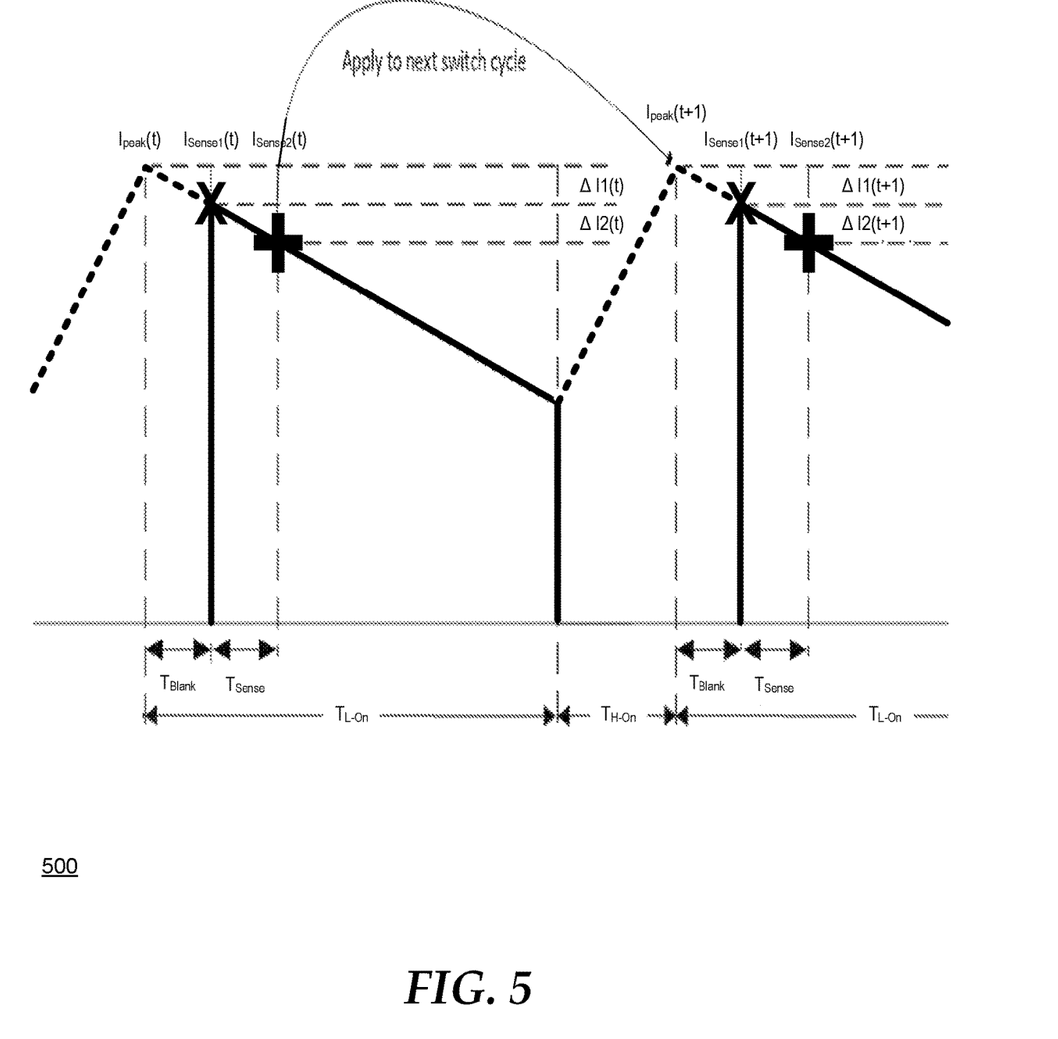
FIG. 5 illustrates a waveform for estimating a blanking time current in the power system of FIG. 4.

FIG. 5 illustrates a current wave form for two switching cycles for power stage 420. Here, the dashed line is the inductor current ($I_L$), which is the target Imon signal that is sought to be reconstructed, and the solid line is low-side FET current sense signal, as blanked by the blanking time ($T_{Blank}$). Here further, the typical current sense point ($I_{Sense1}$) of the inductor current ($I_L$) at the end of the blanking time ($T_{Blank}$) is shown with an "X." In a particular embodiment, Imon logic 424 operates to add an additional current sense point ($I_{Sense2}$) of the inductor current ($I_L$), as shown with a "+." In the illustrated example, the additional sense point ($I_{Sense2}$) is detected at a sense time ($T_{Sense}$) after the blanking time ($T_{Blank}$). Here, in an exemplary case:

$$T_{Sense} = T_{Blank} \qquad \text{Equation 2.}$$

Note that the slope of the current curve (dashed line) in the blanking time ($T_{Blank}$) is assumed to be equal to the slope of the current curve (solid line) after the blanking time ($T_{Blank}$), because the current will be understood to have a slew rate (di/dt) that is constant. As such, a difference between the sensed current at the end of the blanking time ($I_{Sense1}$) and the current sensed at the end of the sense time ($I_{sense2}$) will be give as:

$$\Delta I2(t) = I_{Sense1}(t) - I_{Sense2}(t) \qquad \text{Equation 3,}$$

and, because of Equation 2:

$$\Delta I1(t) = \Delta I2(t) \qquad \text{Equation 4.}$$

Here, Imon logic 424 operates to estimate the peak current value for a next cycle $I_{Peak}(t+1)$ as:

$$I_{Peak}(t+1) = \Delta I1(t) + I_{Sense1}(t) \qquad \text{Equation 5.}$$

The result in Equation 6 can be generalized to cases where the sense time ($T_{Sense}$) differs from the blanking time ($T_{Blank}$) by noting that:

$$\Delta I1(t/T_{Blank}) = \Delta I2(t)/T_{Sense} \qquad \text{Equation 6,}$$

or:

$$\Delta I1(t) = \Delta I2(t) \times (T_{Blank}/T_{sense}) \qquad \text{Equation 7.}$$

Thus the generalized version of Equation 5 is given as:

$$I_{Peak}(t+1) = (k \times \Delta I2(t)) + I_{Sense1}(t) \qquad \text{(Equation 8,}$$

where:

$$k = T_{Blank}/T_{Sense} \qquad \text{Equation 9.}$$

Figure 6:
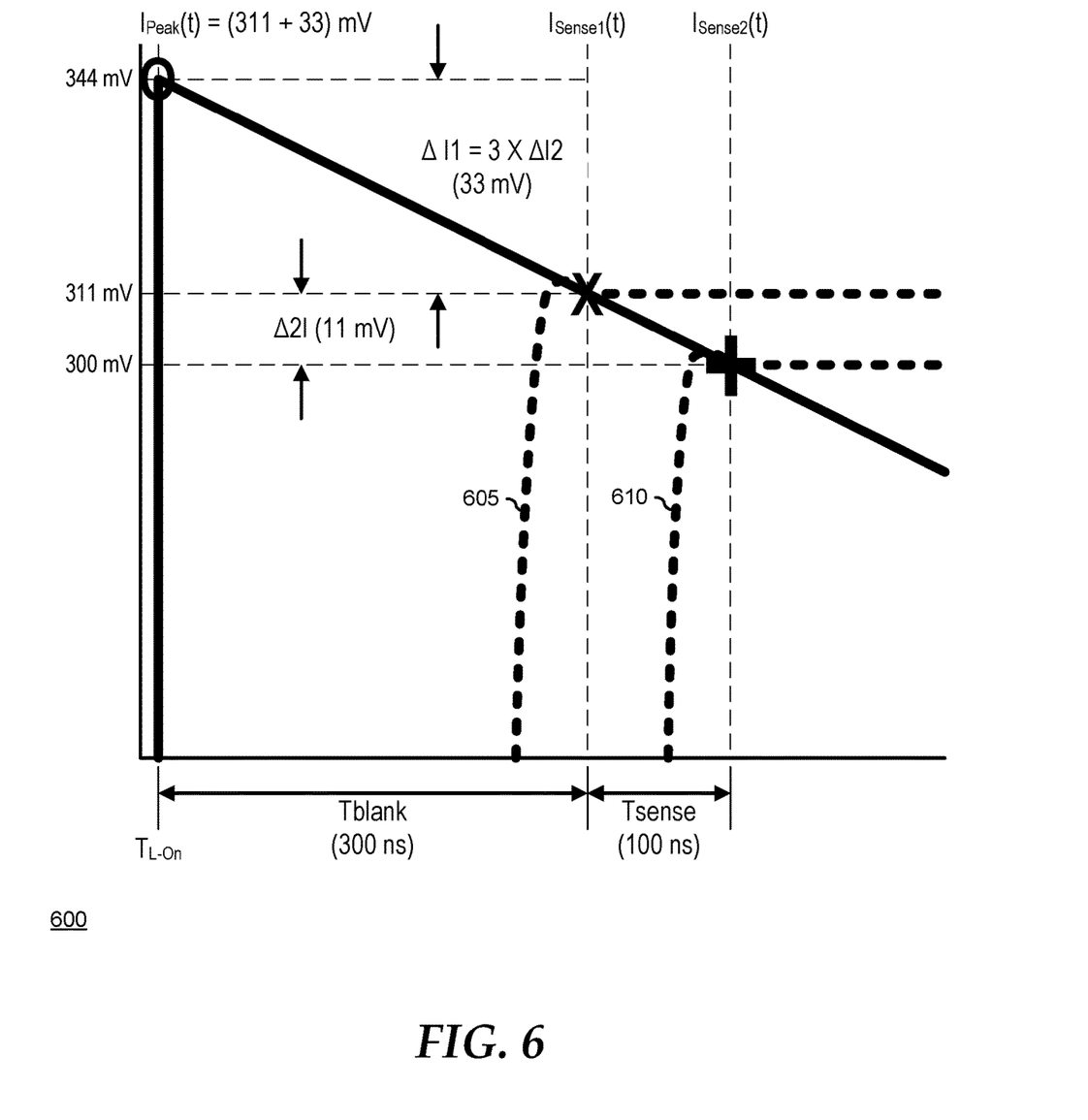
FIG. 6 illustrates an exemplary waveform for estimating a blanking time current in the power system of FIG. 4.

FIG. 6 illustrates an example were $T_{Blank}$=300 nanoseconds (ns), and $T_{Sense}$=100 ns. As such, from Equation 8, k=3. Here current at the end of the blanking time ($I_{Sense1}$) is noted with an "X" at 311 mV, and the current at the end of the sense time ($I_{Sense2}$) is noted with a "+" at 300 mV. Thus $\Delta I2$=311 mV−300 mV=11 mV. Then, from Equation 8:

$$I_{Peak}(t+1) = (3 \times 11 \text{ mV}) + 311 \text{ mV} = 344 \text{ mV} \qquad \text{Equation 10.}$$

Note that power stage 420 as illustrated does not include a resistor input to provide an indication of an inductance. In a particular embodiment, a power stage similar to power stage 420 includes such a resistor in addition to the use of the current estimation as described herein. In a particular embodiment, a power stage similar to power stage 120 provides an Imon signal that includes a direct readout of the measured currents, without, for example, providing a blanking time to the Imon signal. Here, an associated power controller operates to receive the Imon signals, and to process the Imon signals as described herein. That is, the power controller operates to provide a blanking time to the Imon signals to avoid estimating the current provided by the power stages, but also operates to provide a sense time to determine the di/dt response of the power stage and to provide an estimate of the peak current based upon the sense time measurement.

Figure 7:
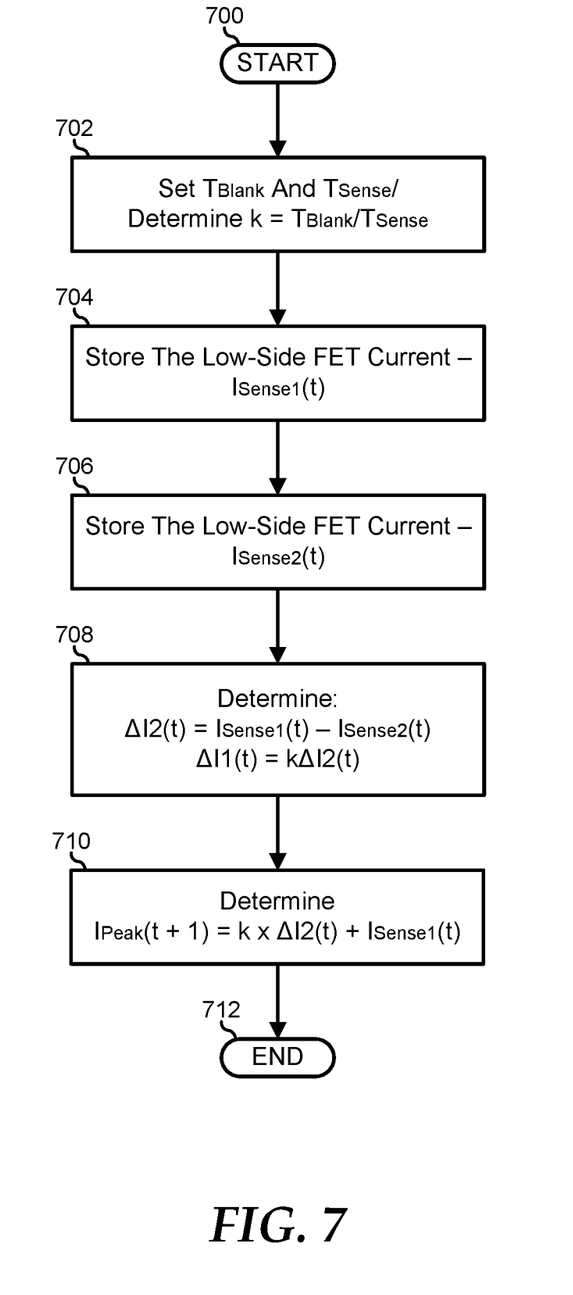
FIG. 7 is a flowchart illustrating method for power stage current-sense accuracy improvement in a power system.

FIG. 7 illustrates a method for power stage current-sense accuracy improvement in a power system, starting at block 700. A blanking time for low-side FET current detection after a low-side gate driver signal is asserted ($T_{Blank}$) is set and a sense time after the blanking time ($T_{Sense}$) is set, and a ratio of the blanking time to the sense time (k) is determined in block 702. A value for the low-side FET current at the end of the blanking time ($I_{Sense2}(t)$ is stored in block 704. A value for the low-side FET current at the end of the sense time ($I_{sense2}(t)$) is stored in block 706. A change in current between the end of the blanking time and the end of the sense time ($\Delta I2$) is determined using Equation 3, and a change in current between a peak current at the assertion of the low-side gate driver signal and the end of the blanking time is calculated using Equation 7 in block 708. The peak current is estimated using Equation 8 in block 710, and the method ends in block 712.

Figure 8:
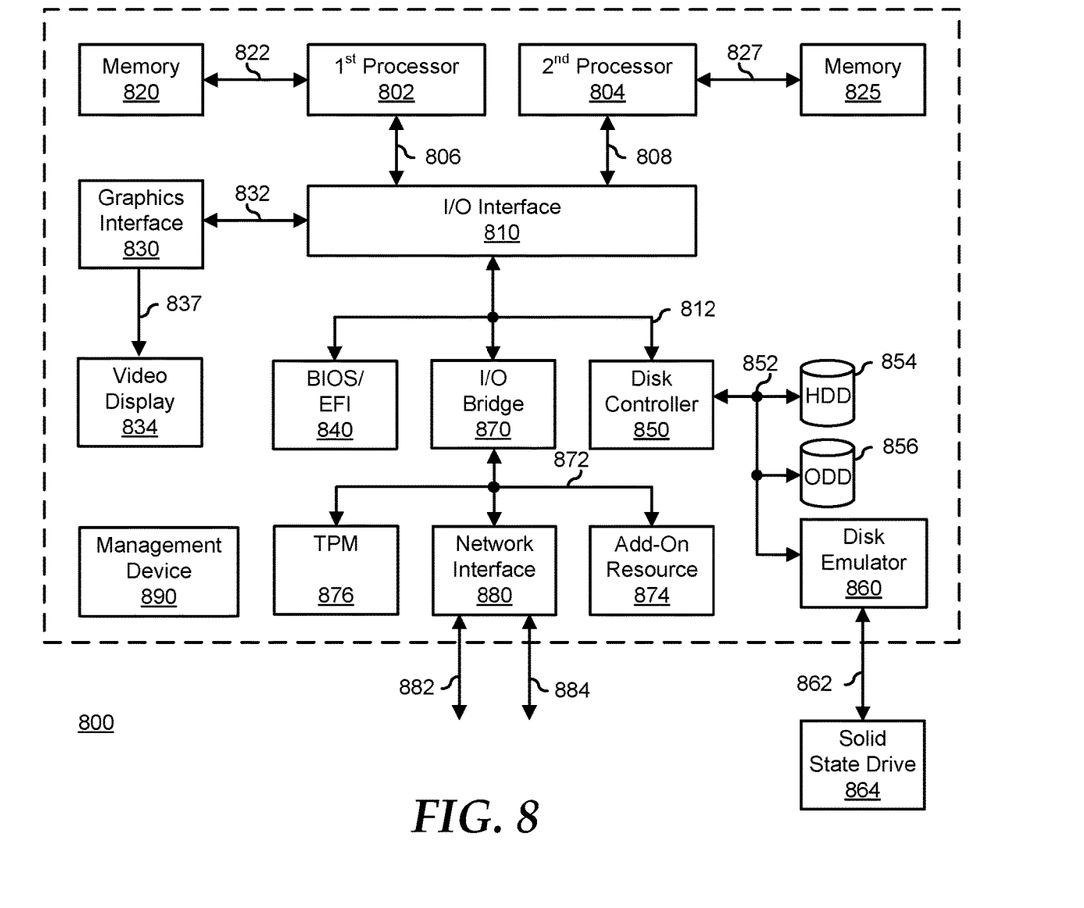
FIG. 8 is a block diagram illustrating a generalized information handling system according to another embodiment of the present disclosure.

FIG. 8 illustrates a generalized embodiment of an information handling system 800 similar to information handling systems 100 and 200. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 800 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 800 can include processing resources for executing machine-executable code, such as a central processing unit (CPU), a programmable logic array (PLA), an embedded device such as a System-on-a-Chip (SoC), or other control logic hardware. Information handling system 800 can also include one or more computer-readable medium for storing machine-executable code, such as software or data. Additional components of information handling system 800 can include one or more storage devices that can store machine-executable code, one or more communications ports for communicating with external devices, and various input and output (I/O) devices, such as a keyboard, a mouse, and a video display. Information handling system 800 can also include one or more buses operable to transmit information between the various hardware components.

Information handling system 800 can include devices or modules that embody one or more of the devices or modules described below, and operates to perform one or more of the methods described below. Information handling system 800 includes a processors 802 and 804, an input/output (I/O) interface 810, memories 820 and 825, a graphics interface 830, a basic input and output system/universal extensible firmware interface (BIOS/UEFI) module 840, a disk controller 850, a hard disk drive (HDD) 854, an optical disk drive (ODD) 856, a disk emulator 860 connected to an external solid state drive (SSD) 862, an I/O bridge 870, one or more add-on resources 874, a trusted platform module (TPM) 876, a network interface 880, a management device 890, and a power supply 895. Processors 802 and 804, I/O interface 810, memory 820, graphics interface 830, BIOS/UEFI module 840, disk controller 850, HDD 854, ODD 856, disk emulator 860, SSD 862, I/O bridge 870, add-on resources 874, TPM 876, and network interface 880 operate together to provide a host environment of information handling system 800 that operates to provide the data processing functionality of the information handling system. The host environment operates to execute machine-executable code, including platform BIOS/UEFI code, device firmware, operating system code, applications, programs, and the like, to perform the data processing tasks associated with information handling system 800.

In the host environment, processor 802 is connected to I/O interface 810 via processor interface 806, and processor 804 is connected to the I/O interface via processor interface 808. Memory 820 is connected to processor 802 via a memory interface 822. Memory 825 is connected to processor 804 via a memory interface 827. Graphics interface 830 is connected to I/O interface 810 via a graphics interface 832, and provides a video display output 836 to a video display 834. In a particular embodiment, information handling system 800 includes separate memories that are dedicated to each of processors 802 and 804 via separate memory interfaces. An example of memories 820 and 830 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 840, disk controller 850, and I/O bridge 870 are connected to I/O interface 810 via an I/O channel 812. An example of I/O channel 812 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 810 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 840 includes BIOS/UEFI code operable to detect resources within information handling system 800, to provide drivers for the resources, initialize the resources, and access the resources. BIOS/UEFI module 840 includes code that operates to detect resources within information handling system 800, to provide drivers for the resources, to initialize the resources, and to access the resources.

Disk controller 850 includes a disk interface 852 that connects the disk controller to HDD 854, to ODD 856, and to disk emulator 860. An example of disk interface 852 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 860 permits SSD 864 to be connected to information handling system 800 via an external interface 862. An example of external interface 862 includes a USB interface, an IEEE 1394 (Firewire) interface, a proprietary interface, or a combination thereof. Alternatively, solid-state drive 864 can be disposed within information handling system 800.

I/O bridge 870 includes a peripheral interface 872 that connects the I/O bridge to add-on resource 874, to TPM 876, and to network interface 880. Peripheral interface 872 can be the same type of interface as I/O channel 812, or can be a different type of interface. As such, I/O bridge 870 extends the capacity of I/O channel 812 when peripheral interface 872 and the I/O channel are of the same type, and the I/O bridge translates information from a format suitable to the I/O channel to a format suitable to the peripheral channel 872 when they are of a different type. Add-on resource 874 can include a data storage system, an additional graphics interface, a network interface card (NIC), a sound/video processing card, another add-on resource, or a combination thereof. Add-on resource 874 can be on a main circuit board, on separate circuit board or add-in card disposed within information handling system 800, a device that is external to the information handling system, or a combination thereof.

Network interface 880 represents a NIC disposed within information handling system 800, on a main circuit board of the information handling system, integrated onto another component such as I/O interface 810, in another suitable location, or a combination thereof. Network interface device 880 includes network channels 882 and 884 that provide interfaces to devices that are external to information handling system 800. In a particular embodiment, network channels 882 and 884 are of a different type than peripheral channel 872 and network interface 880 translates information from a format suitable to the peripheral channel to a format suitable to external devices. An example of network channels 882 and 884 includes InfiniBand channels, Fibre Channel channels, Gigabit Ethernet channels, proprietary channel architectures, or a combination thereof. Network channels 882 and 884 can be connected to external network resources (not illustrated). The network resource can include another information handling system, a data storage system, another network, a grid management system, another suitable resource, or a combination thereof.

Management device 890 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 800. In particular, management device 890 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 800, such as system cooling fans and power supplies. Management device 890 can include a network connection to an external management system, and the management device can communicate with the management system to report status information for information handling system 800, to receive BIOS/UEFI or system firmware updates, or to perform other task for managing and controlling the operation of information handling system 800. Management device 890 can operate off of a separate power plane from the components of the host environment so that the management device receives power to manage information handling system 800 when the information handling system is otherwise shut down. An example of management device 890 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 890 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A power system for an information handling system, the power system comprising:
   a power control module configured to receive a current level signal and to provide a pulse-width modulation (PWM) signal in response to the current level signal; and
   a power stage including a switching power converter having a high-side switch and a low-side switch, a driver circuit configured to receive the PWM signal and to drive the switching power converter based upon the PWM signal, and a current sensing circuit configured to detect a low-side current level on the low-side switch, and to provide the current level signal, wherein the current level signal includes the low-side current level;
   wherein the power system is configured to turn on the low-side switch at a first time, and to estimate a first low-side current level at the first time, wherein in estimating the first low-side current level, the power system is further configured to detect a second low-side current level at a second time while the low-side switch is turned on, the second time being a first duration of time after the first time, and to detect a third low-side current level at a third time while the low-side switch is turned on, wherein the third time is a second duration of time after the second time, wherein the first low-side current level is estimated based upon the second and third low-side current levels, to determine a current difference between the second low-side current level and the third low-side current level, and to divide the current difference by the second duration of time;
   wherein the first low-side current level is estimated as:
   I1=(k×ΔI)+I2, where I1 is the estimated first low-side current level, I2 is the second low-side current level, ΔI is the current difference, and:
   k=T1/T2, where T1 is the first duration of time, and T2 is the second duration of time.

2. The power system of claim 1, wherein the first duration of time is provided to permit noise on the low-side switch to subside.

3. The power system of claim 1, wherein the first duration of time is equal to the second duration of time.

4. The power system of claim 3, wherein the first low-side current level is estimated as the sum of the second current level and the current difference.

5. The power system of claim 1, wherein the first duration of time is different from the second duration of time.

6. The power system of claim 1, wherein the power stage provides the estimate.

7. The power system of claim 1, wherein the power control module provides the estimate.

8. The power system of claim 1, wherein the current sensing circuit includes a resistor to provide an indication of a load inductance.

9. The power system of claim 1, wherein the power system is further configured to apply the estimate of the first low-side current level on a subsequent cycle of the PWM signal.

10. A method, comprising:
    receiving, by a power control module of a power system, a current level signal;
    providing, by the power control module, a pulse-width modulation (PWM) signal in response to the current level signal;
    receiving, by a driver circuit of a power stage of the power system, the PWM signal, wherein the power stage includes a switching power converter having a high-side switch and a low-side switch;
    driving, by the driver circuit, the switching power converter based upon the PWM signal;
    detecting, by a current sensing circuit of the power stage, a low-side current level on the low-side switch;
    providing, by the current sensing circuit, the current level signal, wherein the current level signal includes the low-side current level;
    turning on the low-side switch at a first time; and
    estimating the first low-side current level at the first time, wherein in estimating the low-side current level, the method further comprises:
    detecting a second low-side current level at a second time while the low-side switch is turned on, the second time being a first duration of time after the first time;
    detecting a third low-side current level at a third time while the low-side switch is turned on, wherein the third time is a second duration of time after the second time, and wherein the first low-side current level is estimated based upon the second and third low-side current levels;
    determining a current difference between the second low-side current level and the third low-side current level; and
    dividing the current difference by a second duration of time between the second time and the third time;

wherein the first low-side current level is estimated as:
I1=(k×ΔI)+I2, where I1 is the estimated first low-side current level, I2 is the second low-side current level, ΔI is the current difference, and:
k=T1/T2, where T1 is the first duration of time, and T2 is the second duration of time.

11. The method of claim 10, further comprising:
providing the first duration of time to permit noise on the low-side switch to subside.

12. The method of claim 10, wherein the first duration of time is equal to the second duration of time.

13. The method of claim 12, wherein the first low-side current level is estimated as the sum of the second current level and the current difference.

14. The method of claim 10, wherein the first duration of time is different from the second duration of time.

15. The method of claim 10, wherein the estimate is provided by one of the power control module and the power stage.

16. The method of claim 10, further comprising receiving, by the current sensing circuit, an indication of a load inductance from a resistor.

17. The method of claim 10, further comprising applying the estimate of the first low-side current level on a subsequent cycle of the PWM signal.

18. A power stage comprising:
a switching power converter having a high-side switch and a low-side switch;
a driver circuit configured to receive a pulse-width modulated (PWM) signal and to drive the switching power converter based upon the PWM signal; and
a current sensing circuit configured to detect a low-side current level on the low-side switch, and to provide the current level signal, wherein the current level signal includes the low-side current level;
wherein the power stage is configured turn on the low-side switch at a first time, and to estimate a first low-side current level at the first time, wherein in estimating the first low-side current level, the power stage is further configured to detect a second low-side current level at a second time while the low-side switch is turned on, the second time being a first duration of time after the first time, and to detect a third low-side current level at a third time while the low-side switch is turned on, wherein the third time is a second duration of time after the second time, wherein the first low-side current level is estimated based upon the second and third low-side current levels, to determine a current difference between the second low-side current level and the third low-side current level, and to divide the current difference by the second duration of time;
wherein the first low-side current level is estimated as:
I1=(k×ΔI)+I2, where I1 is the estimated first low-side current level, I2 is the second low-side current level, ΔI is the current difference, and:
k=T1/T2, where T1 is the first duration of time, and T2 is the second duration of time.

19. The power stage of claim 18, wherein the current sensing circuit includes a resistor to provide an indication of a load inductance.

20. The power stage of claim 18, wherein the power system is further configured to apply the estimate of the first low-side current level on a subsequent cycle of the PWM signal.

* * * * *